United States Patent
Dacic et al.

(10) Patent No.: US 10,610,054 B2
(45) Date of Patent: Apr. 7, 2020

(54) ASH CATCHER AND SUPPORT CLIP FOR GRILLS

(71) Applicants: Slavisa Dacic, Hanover Park, IL (US); Eric Hlinka, Bartlett, IL (US)

(72) Inventors: Slavisa Dacic, Hanover Park, IL (US); Eric Hlinka, Bartlett, IL (US)

(73) Assignee: Weber-Stephen Products LLC, Palatine, IL (US)

( * ) Notice: Subject to any disclaimer, the term of this patent is extended or adjusted under 35 U.S.C. 154(b) by 595 days.

(21) Appl. No.: 15/249,628

(22) Filed: Aug. 29, 2016

(65) Prior Publication Data

US 2018/0055284 A1    Mar. 1, 2018

(51) Int. Cl.
*A47J 37/07* (2006.01)
*F16M 13/02* (2006.01)
*F16B 2/24* (2006.01)

(52) U.S. Cl.
CPC ....... *A47J 37/0786* (2013.01); *A47J 37/0704* (2013.01); *F16B 2/245* (2013.01)

(58) Field of Classification Search
CPC .................. A47J 37/0786; A47J 37/0704
USPC ... 248/229.2, 229.23, 229.26, 226.11, 227.3, 248/230.1, 230.4, 230.7, 231.51, 231.81; 211/62, 65, 67, 68, 70.2, 70.8; 126/25 R, 126/29, 242, 243
See application file for complete search history.

(56) References Cited

U.S. PATENT DOCUMENTS

| | | | | |
|---|---|---|---|---|
| 1,288,199 A * | 12/1918 | Rice | ....................... | A47B 61/00 108/30 |
| D56,064 S * | 8/1920 | Harpur | .......................... | D19/81 |
| 3,598,247 A * | 8/1971 | Papers | ..................... | A45B 3/00 135/16 |
| 4,416,248 A | 11/1983 | Schlosser | | |
| 4,498,452 A | 2/1985 | Schlosser | | |
| 4,576,140 A | 3/1986 | Schlosser | | |
| 5,351,920 A * | 10/1994 | Decky | ....................... | F16L 3/13 248/222.52 |
| D355,566 S | 2/1995 | Stephen | | |
| 6,363,925 B1 * | 4/2002 | Chavana, Jr. | ....... | A47J 37/0731 126/25 A |
| 6,473,943 B1 * | 11/2002 | Thacker | ................. | B65D 63/02 24/20 EE |
| 2003/0189144 A1 * | 10/2003 | Byrne | .................... | A47G 7/045 248/226.11 |
| 2006/0054158 A1 * | 3/2006 | Nash | .................... | A47J 37/0786 126/25 R |
| 2006/0191527 A1 | 8/2006 | Steadman | | |
| 2009/0020108 A1 | 1/2009 | Chiang | | |
| 2009/0049656 A1 * | 2/2009 | Morita | ..................... | F16L 33/03 24/20 R |
| 2012/0111877 A1 * | 5/2012 | Marshall | ............... | B31F 1/0038 220/674 |

(Continued)

OTHER PUBLICATIONS

Advanced Fluid Solutions, Mikalor Spring Clip.
XSPC, Black Steel Spring Clip 13-15mm (1/2 OD).

*Primary Examiner* — Grant Moubry
*Assistant Examiner* — Rabeeul I Zuberi
(74) *Attorney, Agent, or Firm* — Vitale, Vickrey, Niro & Gasey LLP

(57) ABSTRACT

The present inventions are directed to an ash catcher system for use with a charcoal grill and having an ash catcher pan and a plurality of support clips.

5 Claims, 4 Drawing Sheets

(56) References Cited

U.S. PATENT DOCUMENTS

| | | | |
|---|---|---|---|
| 2012/0291232 A1* | 11/2012 | Nakamura | F16L 33/03 |
| | | | 24/16 R |
| 2013/0098916 A1* | 4/2013 | Charles | B65D 25/00 |
| | | | 220/507 |
| 2016/0045065 A1* | 2/2016 | Pribyl | A47J 37/04 |
| | | | 426/523 |

* cited by examiner

ASH CATCHER AND SUPPORT CLIP FOR GRILLS

FIELD OF THE INVENTION

The present invention relates generally to grills and more particularly, to an improved ash catcher system having an ash catcher pan and support clips for use with charcoal grills.

BACKGROUND OF THE INVENTION

Charcoal grills are well known and very popular. Charcoal grills typically include a lower portion or chamber and an upper portion or lid. The upper portion includes vent openings and a closure mechanism associated with the vent openings to adjust the size of the openings to control temperature and fuel combustion. The lower portion or chamber includes a fuel grate located near the bottom of the chamber to hold the charcoal or other fuel used for cooking. A cooking grate is located near the top of the chamber and above the fuel grate to support the food being cooked. Vent openings are also provided on the bottom of the chamber to provide combustion air for the cooking fuel and to provide a means to clean-out ashes and other debris that accumulates during the cooking process. A plurality of support logs are also provided.

A particularly popular charcoal grill is sold by Weber-Stephen Products LLC and referred to as a Weber Kettle®. A typical Weber Kettle® is shown in FIG. 1. As shown, grill 10 consists of a generally hemispherical, upwardly open lower chamber 12 that includes a plurality of vent openings at the bottom (not shown). A lid 13 having vent holes (not shown) and a vent closure mechanism 14 is also provided. The lower chamber 12 is supported by three legs 15 arranged in a tripod configuration which are attached to the lower chamber 12 by inserting into sockets 16. An ash catcher 17 is positioned below lower chamber 12 and is secured to legs 15 by spring clamps 18. In this representative example, the ash catcher 17 and clamps 18 are of the type shown and described in U.S. Pat. No. 4,576,140, which is assigned to Weber-Stephen Products LLC and is incorporated herein by reference. An ash disposal damper mechanism 19 may also be provided to aid in the removal of accumulated ash in the lower chamber 12. An example of a typical damper mechanism is shown and described in U.S. Pat. No. 4,416,248, also assigned to Weber-Stephen Products LLC and incorporated herein by reference.

While prior ash catchers have performed satisfactorily, including that shown in U.S. Pat. No. 4,576,140, as well as other types discussed therein, there are certain drawbacks. For example, the prior art ash catcher bowls are shallow. As a result, they hold less ash and are more susceptible to ash being blown out by wind. Moreover, bowl size in the prior devices was limited because of the structure and operation of the clamps, slots or other means to secure them to the legs. In addition, some users found the prior art spring clamps awkward to use, since the spring arm had to be squeezed within the leg structure. And, depending upon the conditions, the clamps were not sufficiently strong and could result in the ash catcher pan becoming unlevel, falling and/or spilling ash.

SUMMARY OF THE INVENTION

The present inventions preserve the advantages of known ash catcher systems and also provide new features and advantages.

Accordingly, it is an object of the present invention to provide an improved ash catcher system having an ash catcher pan and support clip.

It is another object of the present invention to provide a deeper ash catcher pan that has a higher ash capacity and/or is less susceptible to wind blowing out ash.

It is an additional object of the present invention to provide a support clip that securely supports the ash catcher pan, is capable of supporting a deeper pan and is easy to install.

Still another object of the present invention is to provide a support clip that is easy to squeeze and/or may be installed by the user on the outside of the legs of the grill.

Yet an additional object of the present invention is to provide a support clip that effectively secures the ash catcher pan to the legs of the grill and which is efficiently and economically manufactured.

In accordance with the present invention, an ash catcher system is provided for use with a grill, the grill having a plurality of legs. The system includes an ash catcher pan having an upper rim, a lower generally horizontal and downwardly facing outer rim, and a bowl portion. A plurality of support clips, each support clip having a generally circular collar portion, squeeze arms attached to one side of the collar portion and a support flange attached to the collar portion on a side opposite of the squeeze arms are also provided. Each squeeze arm may include an angled portion and a grip portion. Preferably, a squeeze angle between each of the angled portions of the support clip of between approximately 75° and 95° is provided, with a squeeze angle of approximately 94° being most preferred. A preferred ash catcher pan also may also include a lip or bead around an upper circumference. Preferably, the angle between the collar portion and the support flange is approximately 114°.

The present invention also provides a support clip for use in securing an ash catcher pan to the legs of a grill. The support clip includes a generally circular clamping or collar portion; two squeeze arms on said clamping portion; and, a support flange extending from said clamping portion. Each squeeze arm may also include an angled portion. In a preferred embodiment, a squeeze angle between the angled portions of the squeeze arms is between approximately 75° and 95°, with 94° being most preferred. The angled portion of the support clip may include a grip portion, with each grip portion being generally parallel to each other. The preferred embodiment also includes a support flange which extends from said clamping portion and is located opposite the squeeze arms on the clamping portion for supporting the ash catcher pan. Slots may also be provided on the clamping portion.

INVENTOR'S DEFINITION OF THE TERMS

The terms used in the claims of this patent are intended to have their broadest meaning consistent with the requirements of law. Where alternative meanings are possible, the broadest meaning is intended. All words used in the claims are intended to be used in the normal, customary usage of grammar and the English language.

BRIEF DESCRIPTION OF THE DRAWINGS

The stated and unstated objects, features and advantages of the present inventions (sometimes used in the singular, but not excluding the plural) will become apparent from the following descriptions and drawings, wherein like reference numerals represent like elements in the various views, and in which.

DETAILED DESCRIPTION OF PREFERRED EMBODIMENTS

Set forth below is a description of what is currently believed to be the preferred embodiments or best representative examples of the inventions claimed. Future and present alternatives and modifications to the embodiments and preferred embodiments are contemplated. Any alternatives or modifications which make insubstantial changes in function, purpose, structure or result are intended to be covered by the claims of this patent.

Figure 1:
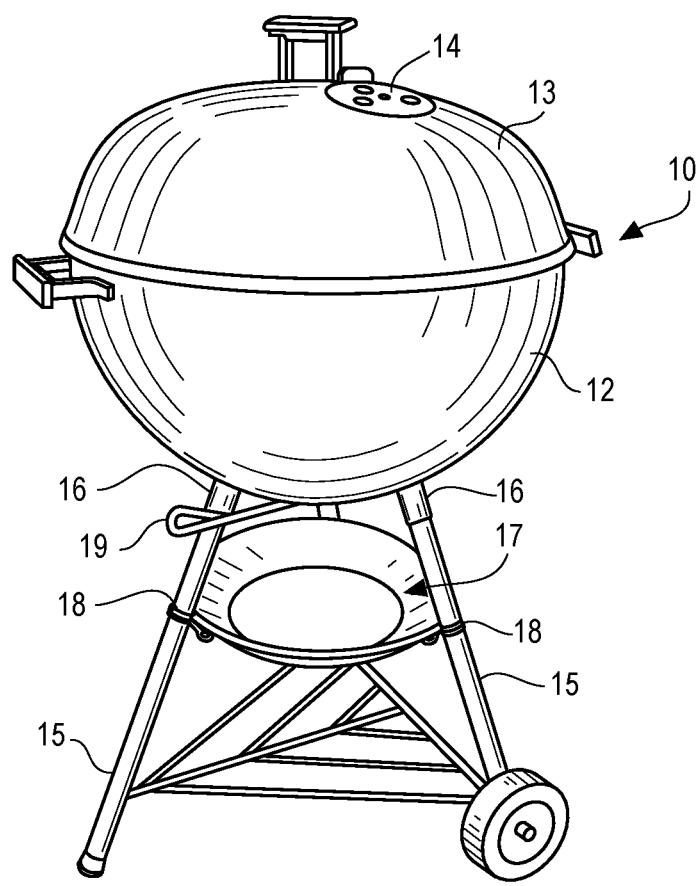
FIG. 1 is a perspective view of a typical prior art charcoal grill and prior art ash catcher system.

For convenience, the present inventions are herein described in relation to a typical Weber Kettle® sold by Weber-Stephen Products LLC, the Assignee of this patent. However, it will be understood that the present inventions may be used with a variety of charcoal grills of other manufacturers. For example, the Weber Kettle® has three support legs 15 that are arranged in a tripod configuration as shown generally in FIG. 1. It will be understood that the present inventions may be used with grills 10 having three legs 15 of a different configuration or leg angles, or with grills 10 having a different number of legs 15 or other support members.

Figure 2:
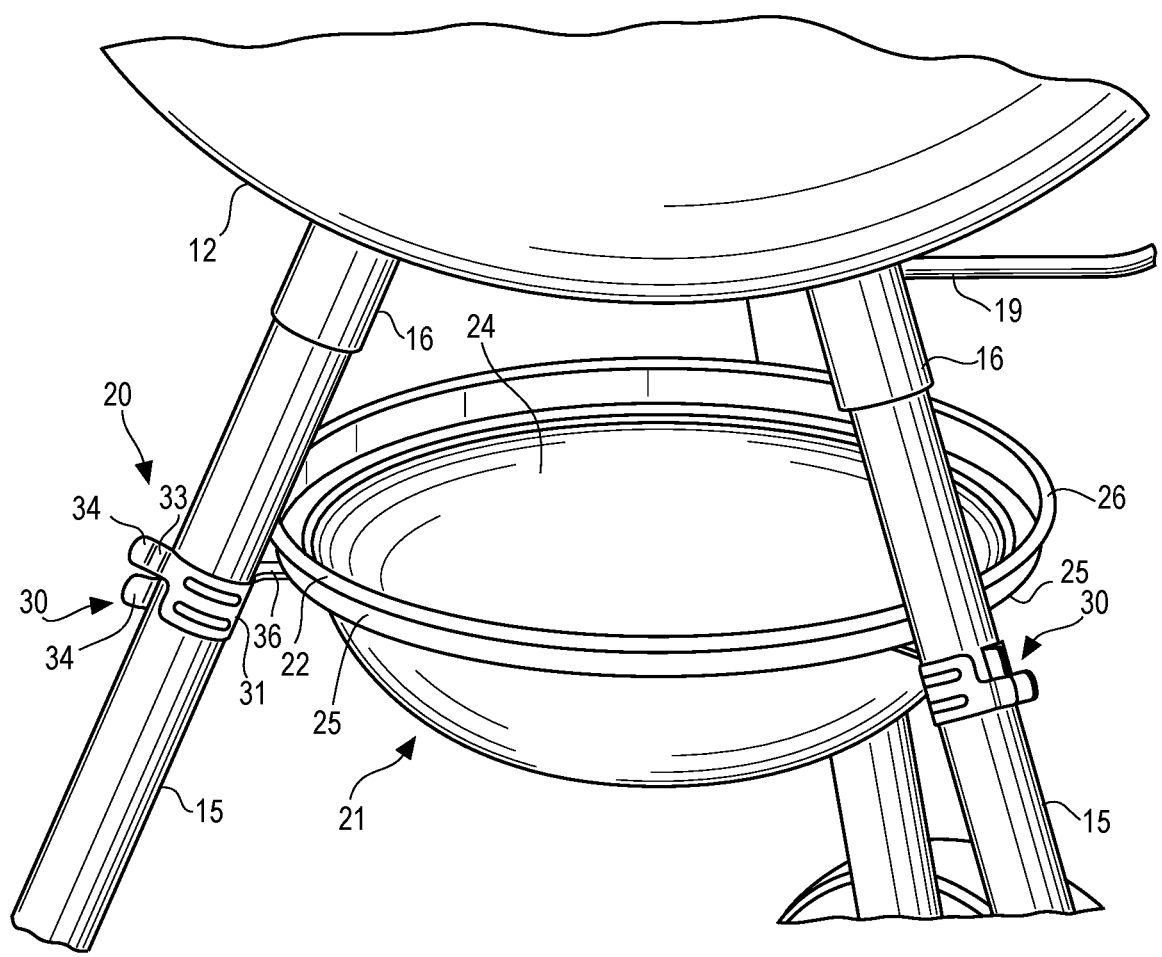
FIG. 2 is an enlarged fragmentary perspective view of the details of the ash catcher system of the present invention shown installed on the legs of a charcoal grill.

Turning to FIG. 2, a preferred embodiment of the ash catcher system 20 of the present invention may be seen. The system 20 generally includes an ash catcher pan 21 and a plurality of support clips 30. As will be understood, the number of support clips 30 coincides with the number of legs 15 of the grill 10.

Figure 3:
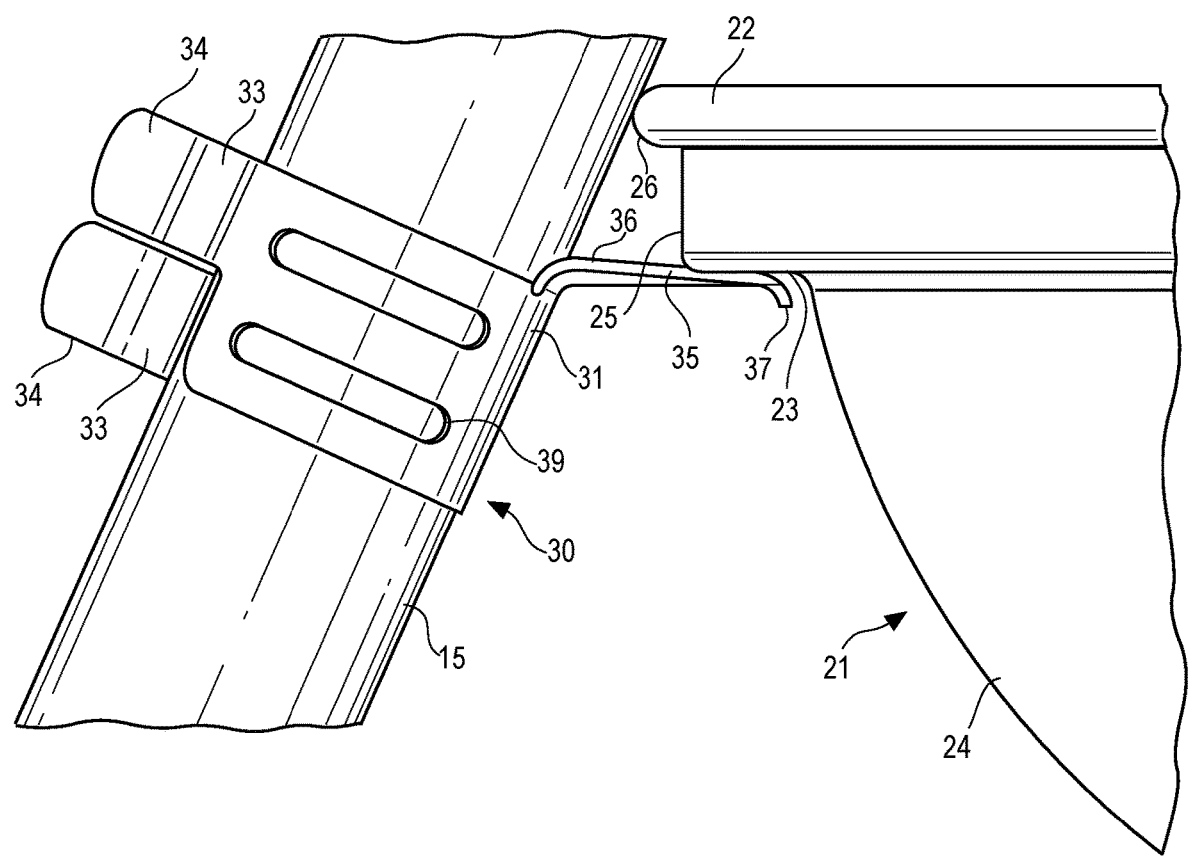
FIG. 3 is a fragmentary enlarged side perspective view of a preferred support clip of the present invention shown supporting a preferred ash catcher pan of the present invention.

A preferred embodiment of ash catcher pan 21 may best be seen by reference to FIGS. 2 and 3. Pan 21 includes an upper rim 22, a lower generally horizontal and downward facing rim 23 and a bowl portion 24. A generally vertical edge 25 may be provided that extends between upper rim 22 and lower outer rim 23. As best shown in FIG. 3, pan 21 may also include a bead or lip 26 around the upper circumference of pan 21. Lip 26 may function to aid in the stability of pan 21 when installed to provide a point of contact with legs 15 to wedge pan 21 against legs 15 and support clip 30 as hereinafter described.

Figure 4:
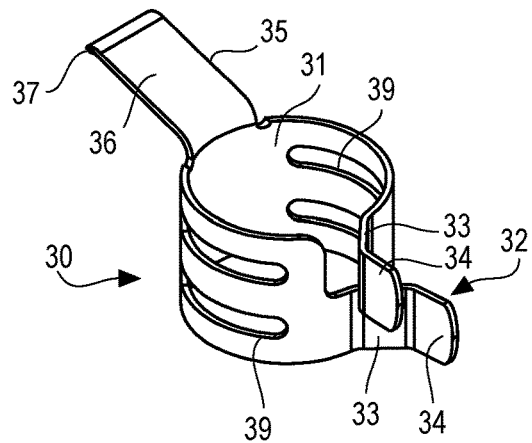
FIG. 4 is a perspective view of a preferred support clip of the present invention.
Figure 5:
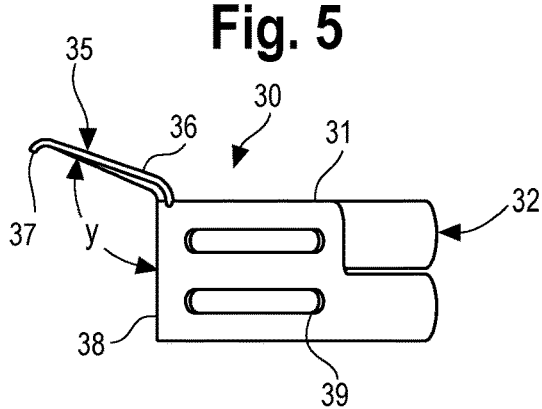
FIG. 5 is a side plan view of the preferred support clip of the present invention.
Figure 6:
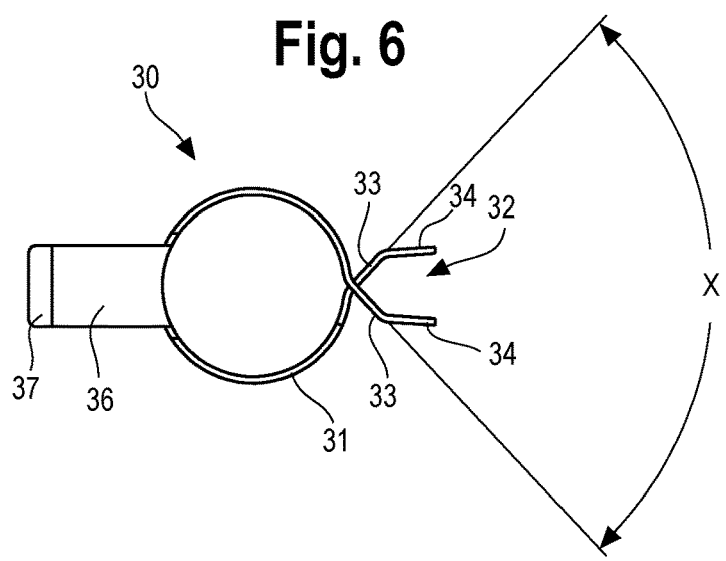
FIG. 6 is a top plan view of the preferred support clip of the present invention.

A preferred embodiment of support clip 30 may be seen by reference to FIGS. 4-6. Clip 30 includes a generally circular collar or clamp portion 31 that may optionally be provided with one or more slots 39. Collar portion 31 is sized to fit over and frictionally grip leg 15 using a spring or clamping force when installed. Slots 39 may be provided to adjust the spring force as hereinafter described or to reduce the material and cost in the manufacture of support clip 30. Depending upon the spring force desired, those of skill will understand that the size and spacing of any slots 39 may be adjusted accordingly.

Support clip 30 is also provided with two squeeze arms 32. In a preferred embodiment, squeeze arms 32 include an angled portion 33 and a grip portion 34. As best shown in FIG. 6, there is an angle X or squeeze angle defined between the interior of the two angled portions 33. In the preferred embodiment, squeeze angle X is approximately 94°. In addition, it has been determined that the preferred range of squeeze angle X is between approximately 75° and 95°. Although other squeeze angles may be used, it has been determined that the stated range provides the best and easiest spring force for the user during installation. In addition, grip portion tabs 34 may optionally be provided so that the user may squeeze the two flat tab surfaces 34 and not be subject to possible sharp edges or scratching. Thus, in the preferred embodiment, grip portion tabs 34 are generally parallel to each other. When the squeeze arms 32 are squeezed together, the opening of clamping portion 31 is increased so that clip 30 may be installed and/or moved along leg 15.

Preferred clip 30 also includes a support flange 35 which preferably extends from an upper surface of clamp portion 31. Flange 35 includes an upper surface 36 that supports pan 21 as hereinafter described. It is preferred that flange 35 is on the opposite side of clamp portion 31 from squeeze arms 32 to aid in use. A downwardly facing chamfer or radiused portion 37 may also be provided at the end of flange 35 to reduce or eliminate sharp edges.

As shown in FIG. 5, an angle Y is defined as the angle between the outer edge 38 of clamp portion 31 and support flange 35. In a preferred embodiment, angle Y is approximately 114°. Using this angle, the upper surface 36 of flange 35 is in a generally horizontal position when attached to an angular leg 15 of a typical Weber Kettle® to support pan 21 as shown generally in FIG. 3. It will be understood by those of skill in the art that different angles Y may be used for grills having legs 15 attached to grill 10 at different angles. Thus, depending upon the angle of legs 15, angle Y may be calculated and adjusted so that upper surface 36 of flange 35 is generally horizontal to support pan 21.

It will be further understood by those of skill that a variety of materials may be used for pan 21 and support clips 30. For example, spring steel, stainless steel and/or aluminum may be used for either component.

The use and operation of a preferred embodiment of the ash catcher system 20 of the present inventions may be seen by reference to FIGS. 2 and 3. When assembling grill 10, support clips 30 are positioned over legs 15 which may then be secured in sockets 16 attached to lower chamber 12. To move support clip 30 along leg 15, the user squeezes grip portion 34 which opens clamping portion 31. When in the proper position, the user releases grip portion 34 and the support clip 30 is frictionally secured to leg 15. Since the grip portions 34 are on the outside of the legs 15, their activation is less awkward for the user. Pan 21 may then be installed.

Specifically, upper surface 36 of support flange 35 engages lower outer rim 23 of pan 21. Upper rim portion 22 and optional lip 26 are forced to abut leg 15. Lower outer rim 23 is supported by upper surface 36 of support flange 35. In this manner, pan 21 is securely attached to and wedged against the three legs 15 of grill 10 using support clips 30. As a result, the present inventions are easier to use than the prior art, enable the use of a higher capacity pan 21 and securely hold the ash catcher system 20 to grill 10.

The above description is not intended to limit the meaning of the words used in or the scope of the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention. In addition, although the term "claimed invention" or "present invention" is sometimes used herein in the singular, it will be understood that there are a plurality of inventions as described and claimed.

Various features of the present inventions are set forth in the following claims.

What is claimed is:

1. An ash catcher system for use with a grill, the grill having a plurality of angular legs, each leg having a circumference, the system comprising:
   a fire resistant ash catcher pan having an upper rim, a lower generally horizontal and downwardly facing outer rim, and a bowl portion;
   a plurality of support clips, each support clip having a generally circular collar portion having a circumference that substantially surrounds the entire circumference of each angular leg, said collar portion having an outer edge that runs parallel to each angular leg, a pair of squeeze arms attached to one side of the collar portion, each squeeze arm including an angled portion and a grip portion, each grip portion forming a substantially flat planar tab, each planar tab being parallel to each other;
   at least one slot on the collar portion, the slot being parallel to the circumference of the collar portion; and
   a support flange attached to an upper portion of the collar portion on a side opposite the squeeze arms, the support flange extending laterally outward from said collar portion, wherein the support flange forms an angle with the outer edge of the collar such that each of the support flanges are disposed in a generally horizontal position when the clips are attached to the angular legs.

2. The ash catcher system of claim 1 wherein a squeeze angle between each of the angled portions is between approximately 75° and 95°.

3. The ash catcher system of claim 2 wherein the squeeze angle is approximately 94°.

4. The ash catcher system of claim 1 wherein the ash catcher pan also includes a lip or bead around an upper circumference.

5. The ash catcher system of claim 1 wherein the angle between the outer edge of the collar portion and the support flange is approximately 114°.

* * * * *